（12) United States Patent
Hartmann et al.

(10) Patent No.: US 10,565,751 B2
(45) Date of Patent: Feb. 18, 2020

(54) METHOD AND APPARATUS FOR SPATIAL DATA VISUALIZATION (71) Applicant: HERE Global B.V., Eindhoven (NL)

(72) Inventors: Friedrich Hartmann, Berlin (DE); Volodymyr Bilonenko, Berlin (DE)

(73) Assignee: HERE Global B.V., Eindhoven (NL)

(*) Notice: Subject to any disclaimer, the term of this patent is extended or adjusted under 35 U.S.C. 154(b) by 89 days.

(21) Appl. No.: 15/282,672

(22) Filed: Sep. 30, 2016

(65) Prior Publication Data
US 2018/0096498 A1 Apr. 5, 2018

(51) Int. Cl.
*G06T 11/20* (2006.01)
*G06T 5/00* (2006.01)
*G06T 7/40* (2017.01)
*G06F 17/30* (2006.01)
*G06F 16/9537* (2019.01)

(52) U.S. Cl.
CPC ........ *G06T 11/206* (2013.01); *G06F 16/9537* (2019.01); *G06T 5/002* (2013.01); *G06T 2207/20021* (2013.01); *G06T 2207/20092* (2013.01)

(58) Field of Classification Search
None
See application file for complete search history.

(56) References Cited

U.S. PATENT DOCUMENTS

| 2009/0013281 A1* | 1/2009 | Helfman | G06F 17/30572 715/788 |
| 2016/0350507 A1* | 12/2016 | Guerin | G06F 19/3443 |
| 2017/0052747 A1* | 2/2017 | Cervelli | G06F 3/0482 |

FOREIGN PATENT DOCUMENTS

WO WO 2014/153560 9/2014

OTHER PUBLICATIONS

Razvan Andonie and Eugen Carai,"Gaussian Smoothing by Optimal Iterated Uniform Convolutions", Computers and Artificial Intelligence, vol. 11. 1992. No. 4. 363-373, https://www.cwu.edu/faculty/sites/cts.cwu.edu.faculty/files//users/142/documents/Gaussian%20Smoothing_96.pdf.*
3. The Gaussian kernel, [online][retrieved Dec. 20, 2016]. Retrieved from the Internet: <URL: http://www.stat.wisc.edu/~mchung/teaching/MIA/reading/diffusion.gaussian.kernel.pdf.pdf>. 13 pages.

(Continued)

*Primary Examiner* — Tize Ma
(74) *Attorney, Agent, or Firm* — Alston & Bird LLP (57) ABSTRACT

A method, apparatus and computer program product are provided to analyze and visualize two or more parameters of spatial data. In the context of a method and for each of a plurality of grid cells, an aggregated representation is identified of the data value(s) associated with a respective grid cell and a count of data values that are associated with the respective grid cell. The method also applies a smoothing function to create a smoothed representation of the data value(s) associated with the respective grid cells and to create a smoothed count of the number of data values that are associated with the respective grid cell. For each of the plurality of grid cells, the method causes presentation of a visual depiction of: (i) a value based on the smoothed representation and the smoothed count of the respective grid cell and (ii) the smoothed count of the respective grid cell.

20 Claims, 5 Drawing Sheets
(2 of 5 Drawing Sheet(s) Filed in Color)

(56) References Cited

OTHER PUBLICATIONS

Blog-1/heatmaps.markdown at master patrick-steel-idem/blog-1 Github[online][retrieved Dec. 16, 2016]. Retrieved from the Internet: <URL: https://github.com/patrick-steele-idem/blog-1/blob/master/heatmaps.markdown>. (Mar. 2013) 3 pages.
Bonneau, G.-P. et al. *Chapter 1: Overview and State-of-the-Art of Uncertainty Visualization* [online][retrieved Dec. 20, 2016]. Retrieved from the Internet: <URL: www.sci.utah.edu/.../Overview-Uncertainty-Visualization-2015.pdf>. 26 pages.
Brodlie, K. et al., *A Review of Uncertainty in Data Visualization* [online][retrieved Dec. 20, 2016]. Retrieved from the Internet: <URL: www.comp.leeds.ac.uk/kwb/publication_repository/2012/uncert.pdf>. 29 pages.
Cola, Lee, *Spatial Forecasting of Disease Risk and Uncertainty*, Cartography and Geographic Information Science, vol. 29, No. 4 (2002) 363-380.
Deutsch, M. et al., *Using Simulation to Quantify Uncertainty in Ultimate Pit Limits and Inform Infrastructure Placement*, [online][retrieved Dec. 20, 2016]. Retrieved from the Internet: <URL: http://www.maptek.com/pdf/insight/Using_Simulation_to_Quantify_Uncertainty_SME-2015.pdf>. MAPTEK, SME (Feb. 2015) 9 pages.
Duchowski, A. et al., *Aggregate Gaze Visualization with Real-time Heatmaps*, [retrieved Dec. 16, 2016]. Retrieved from the Internet: <URL: https://www.cs.utah.edu/~miriah/publications/gaze-vis.pdf>. 8 pages.
*Gaussian Kernel Calculator, The Devil in the Details* [online][retrieved Dec. 20, 2016]. Retrieved from the Internet: <URL: http://dev.theomader.com/gaussian-kernel-calculator/>. (Jan. 30, 2014) 8 pages.
*Geog183: Cartographic Design and Geovisualization Spring Quarter 2016, Lecture 11: Dasymetric and isarithmic mapping*, [online][retrieved Dec. 20, 2016]. Retrieved from the Internet: <URL: http://www.geog.ucsb.edu/~kclarke/Geography183/Lecture11.pdf>. 45 pages.
*Gigawiz—Aabel NG, What's New?* [online][retrieved Dec. 16, 2016]. Retrieved from the Internet: <URL: http://www.gigawiz.com/new.html>. (2016) 14 pages.
*Gigawiz—An Overview of Aabel NG: NG2, v5 x64* [online][retrieved Dec. 16, 2016]. Retrieved from the Internet: <URL: http://www.gigawiz.com/aabelng.html>. (2016) 36 pages.
*GIS—Maps for the Web* [online][retrieved Dec. 16, 2016]. Retrieved from the Internet: <URL: http://www.web-maps.com/gisblog/?cat=11>. (Jun. 2015) 62 pages.
Godfrey, P. et al., *Visualization through Inductive Aggregation*, Proc. 19th International Conference on Extending Database Technology (EDBT) (Mar. 2016) 600-603.
*Javascript—Heatmap in webgl—using alpha channel for intensity—Stack Overflow*[online][retrieved Dec. 16, 2016]. Retrieved from the Internet: <URL: http://stackoverflow.com/questions/27484795/heatmap-in-webgl-using-alpha-channel-for-intensity>. (Dec. 2014) 2 pages.
*Reliability Visualization System (RVIS)*[online][retrieved Dec. 20, 2016]. Retrieved from the Internet: <URL: https://www.geovista.psu.edu/publications/RVIS/>. 4 pages.
Senaratne, H. et al., *Usability of Spatio-Temporal Uncertainty Visualisation Methods*[online][retrieved Dec. 20, 2016]. Retrieved from the Internet: <URL: pebesma.staff.ifgi.de/agile2012.pdf>. 18 pages.
Sparks, David, *Isarithmic Maps of Public Opinion Data*, [online][retrieved Dec. 20, 2016]. Retrieved from the Internet: <URL: https://dsparks.wordpress.com/2011/10/24/isarithmic-maps-of-public-opinion-data/>. (Oct. 24, 2011) 10 pages.
*Uncertainty Visualisation* [online][retrieved Dec. 20, 2016]. Retrieved from the Internet: <URL: https://de.pinterest.com/jessie0950/uncertainty-visualisation/>. 3 pages.
*Visual Representations of Data Uncertainty, GEOG 486: Cartography and Visualization* [online][retrieved Dec. 20, 2016]. Retrieved from the Internet: <URL: https://www.e-education.psu.edu/geog486/node/1891>. 7 pages.
*Visualization of Climatology Models, Collaborative Construction and Visualization of Scientific Models*[online][retrieved Dec. 20, 2016]. Retrieved from the Internet: <URL: https://people.eecs.ku.edu/~miller/CVR/Climatology/>. 2 pages.
*What output surface types can the interpolation models generate?—Help, ArcGIS Desktop* [online][retrieved Dec. 16, 2016]. Retrieved from the Internet: <URL: http://desktop.arcgis.com/en/arcmap/latest/extensions/geostatistical-analyst/what-output-surface-types-can-the-interpolation-models-generate-.htm>. 5 pages.
Gotway, C et al., "A Geostatistical Approach to Linking Geographically Aggregated Data from Different Sources", Journal of Computational and Graphical Statitics, vol. 16, No. 1, dated Mar. 1, 2007, pp. 115-135.
Extended European Search Report for European Application No. 17193859.0 dated Aug. 31, 2018, 10 pages.

* cited by examiner

METHOD AND APPARATUS FOR SPATIAL DATA VISUALIZATION

TECHNICAL FIELD

An example embodiment relates generally to spatial data visualization and analysis and, more particularly, to a method, apparatus and computer program product that applies a smoothing function to a representation of the spatial data to facilitate the visualization.

BACKGROUND

A variety of different spatial data is collected and analyzed for a myriad of purposes. Spatial data is data that is associated with certain spatial locations. Although spatial data may come in various forms, an example of spatial data includes data indicative of the signal strength of cellular or other types of network signals at each of a plurality of different spatial locations. Various types of weather data, such as temperature, humidity, rainfall, snow accumulation or the like, are also examples of spatial data with the weather data being measured at and associated with different spatial locations. As another example, the speed at which vehicles are traveling at different locations along a road network is also a type of spatial data.

As the spatial data is associated with different spatial locations, spatial data may be visualized by overlaying a representation of the spatial data on a map. As the value of the spatial data associated with a particular spatial location is sometimes represented by color, the resulting overlay of the spatial data onto a map may be referred to as a heat map.

The visualization of spatial data, such as in the form of a heat map or otherwise, is sometimes provided by a client device and, more particularly, by a web browser operating upon a client device. Web browsers may be limited, however, in terms of the quantity of data that the web browser can analyze and display in a timely manner as a result of, for example, the connection transfer speed. For example, web browsers may be limited to the analysis and display of a few megabytes (MB) of data. However, the quantity of spatial data that is provided for analysis and visualization is increasing and, in some instances, is a substantially greater quantity of data, such as gigabytes (GB) of data, than that which web browsers can analyze and display in a timely and efficient manner.

BRIEF SUMMARY

A method, apparatus and computer program product are provided in accordance with an example embodiment in order to analyze and visualize two or more parameters, such as two or more types of spatial data. In an example embodiment, the method, apparatus and computer program product applies a smoothing function such that the resulting visual depiction of the parameters is enhanced and can be more readily analyzed by a user. Additionally, the method, apparatus and a computer program product of an example embodiment are configured to receive and analyze large quantities of data, such as quantities of data that exceed the limitations of a web browser, with the resulting data being visually represented, such as by a web browser, in an efficient and timely manner.

In an example embodiment, a method is provided that includes identifying, for each of a plurality of grid cells, an aggregated representation of one or more data values associated with a respective grid cell and a count of data values that are associated with the respective grid cell. The method also includes applying a smoothing function, such as a uniform function, an Epanechnikov function or a Gaussian function, to the aggregated representation and to the count of the plurality of grid cells. The method applies the smoothing function by creating a smoothed representation of the one or more data values associated with the respective grid cells such that the aggregated representation of one or more neighboring grid cells influences the smoothed representation of the respective grid cell. The method also applies the smoothing function to create a smoothed count of the number of data values that are associated with the respective grid cell. For each of the plurality of grid cells, the method causes presentation of a visual depiction of: (i) a value based on the smoothed representation and the smoothed count of the respective grid cell and (ii) the smoothed count of the respective grid cell.

The plurality of grid cells of an example embodiment comprise a map upon which the value and the smoothed count are presented. In this example embodiment, the method causes presentation of a visual depiction by causing presentation of a visual depiction of the value with the value represented by a color of the respective grid cell and by causing presentation of a visual depiction of the smoothed count with the smoothed count represented by opacity of the respective grid cell. The method of an example embodiment also includes determining, for each of the plurality of grid cells, an average of the smoothed representation of the respective grid cell. In this example embodiment, the value that is visually depicted is based on the average. The method of an example embodiment also includes receiving user input defining a bandwidth of the smoothing function. In this example embodiment, the method applies the smoothing function so as to have the bandwidth defined by the user input. In an example embodiment, the method causes presentation of a visual depiction by a web browser. In this example embodiment, the method determines the aggregated representation and the count by receiving with the web browser the aggregated representation and the count from a server.

In another example embodiment, an apparatus is provided that includes at least one processor and at least one memory including computer program code with the at least one memory and the computer program code configured to, with the processor, cause the apparatus to at least identify, for each of a plurality of grid cells, an aggregated representation of one or more data values associated with a respective grid cell and a count of a number of data values that are associated with the respective grid cell. The at least one memory and computer program code are also configured to, with the processor, cause the apparatus to apply a smoothing function to the aggregated representations and the counts of the plurality of grid cells. For example, the smoothing function may be a uniform function, an Epanechnikov function or a Gaussian function. The at least one memory and computer program code are configured to, with the processor, cause the apparatus to apply the smoothing function to create a smoothed representation of the one or more data values associated with the respective grid cell such that the aggregated representation of one or more neighboring grid cells influences the smoothed representation of the respective grid cell. The at least one memory and the computer program code are further configured to, with the processor, cause the apparatus to apply the smoothing function to also create a smoothed count of the number of data values that are associated with the respective grid cell. For each of the plurality of grid cells, the at least one memory and computer program code are configured to, with the processor, cause the apparatus to cause presentation of a visual depiction of: (i) a value based on the smoothed representation and the smoothed count of the respective grid cell and (ii) the smoothed count of the respective grid cell.

The plurality of grid cells of an example embodiment comprise a map upon which the value and the smoothed count are visually depicted. In this example embodiment, the at least one memory and computer program code are configured to, with the processor, cause the apparatus to cause presentation of a visual depiction of the value with the value represented by a color of the respective grid cell and to cause presentation of a visual depiction of the smoothed count with the smoothed count represented by opacity of the respective grid cell. The at least one memory and computer program code are further configured to, with the processor, cause the apparatus of an example embodiment to determine, for each of the plurality of grid cells, an average of the smoothed representation of the respective grid cell. In this example embodiment, the value that is visually depicted is based on the average. The at least one memory and computer program code are further configured to, with the processor, cause the apparatus of an example embodiment to receive user input defining a bandwidth of the smoothing function. In this example embodiment, the at least one memory and computer program code are configured to, with the processor, cause the apparatus to apply the smoothing function having the bandwidth defined by the user input. The at least one memory and computer program code are configured to, with the processor, cause the apparatus of an example embodiment to cause presentation of a visual depiction by a web browser. In this example embodiment, the at least one memory and computer program code are configured to, with the processor, cause the apparatus to determine the aggregated representation and the count by receiving with the web browser the aggregated representation and the count from a server.

In a further example embodiment, a computer program product is provided that includes at least one non-transitory computer-readable storage medium having computer-executable program code portions stored therein with the computer-executable program code portions including program code instructions configured to identify, for each of a plurality of grid cells, an aggregated representation of one or more data values associated with a respective grid cell and a count of a number of data values that are associated with the respective grid cell. The computer-executable program code portions also include program code instructions configured to apply a smoothing function to the aggregated representations and the counts of the plurality of grid cells. For example, the smoothing function may be a uniform function, an Epanechnikov function or a Gaussian function. The program code instructions configured to apply the smoothing function include program code instructions configured to create a smoothed representation of the one or more data values associated with the respective grid cell such that the aggregated representation of one or more neighboring grid cells influences the smoothed representation of the respective grid cell. The program code instructions configured to apply the smoothing function also include program code instructions configured to create a smoothed count of the number of data values that are associated with the respective grid cell. The computer-executable program code portions further include program code instructions configured to, for each of the plurality of grid cells, cause presentation of a visual depiction of: (i) a value based on the smoothed representation and the smoothed count of the respective grid cell and (ii) the smoothed count of the respective grid cell.

The plurality of grid cells of an example embodiment comprise a map upon which the value and the smoothed count are visually depicted. In this example embodiment, the program code instructions configured to cause presentation of a visual depiction include program code instructions configured to cause presentation of a visual depiction of the value with the value represented by a color of the respective grid cell. The program code instructions configured to cause presentation of a visual depiction also include program code instructions configured to cause presentation of a visual depiction of the smoothed count with the smoothed count represented by opacity of the respective grid cell. The computer-executable program code portions of an example embodiment further include program code instruction configured to, for each of the plurality of grid cells, determine an average of the smoothed representation for the respective grid cell. In this example embodiment, the value that is visually depicted is based on the average. The computer-executable program code portions of an example embodiment also include program code instructions configured to receive user input defining a bandwidth of the smoothing function. In this example embodiment, the program code instructions configured to apply the smoothing function include program code instructions configured to apply the smoothing function so as to have the bandwidth defined by the user input. In an example embodiment, the program code instructions configured to cause presentation of a visual depiction include program code instructions configured to cause presentation of a visual depiction by a web browser. In this example embodiment, the program code instructions configured to determine the aggregated representation of the count include program code instructions configured to receive with the web browser the aggregated representation and the count from a server.

In yet another example embodiment, an apparatus is provided that includes means for identifying, for each of a plurality of grid cells, an aggregated representation of one or more data values associated with the respective grid cell and the count of a number of data values that are associated with the respective grid cell. The apparatus of this example embodiment also includes means for applying a smoothing function to the aggregated representations and the counts of the plurality of grid cells. The means for applying the smoothing function includes means for creating a smoothed representation of the one or more data values associated with the respective grid cell such that the aggregated representation of one or more neighboring grid cells influences the smoothed representation of the respective grid cell. The means for apply the smoothing function also includes means for creating a smoothed count of the number of data values that are associated with the respective grid cell. The apparatus further includes means for causing, for each of the plurality of grid cells, presentation of the visual depiction of: (i) a value based on the smoothed representation and the smoothed count of the respective grid cell and (ii) the smoothed count of the respective grid cell.

BRIEF DESCRIPTION OF THE DRAWINGS

The patent application file contains at least one drawing executed in color. Copies of this patent application with color drawings will be provided by the Office upon request and payment of the necessary fee.

Having thus described certain example embodiments of the present disclosure in general terms, reference will here- inafter be made to the accompanying drawings, which are not necessarily drawn to scale, and wherein:

DETAILED DESCRIPTION

Some embodiments will now be described more fully hereinafter with reference to the accompanying drawings, in which some, but not all, embodiments are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with example embodiments. Thus, use of any such terms should not be taken to limit the spirit and scope of embodiments of the present disclosure.

A method, apparatus and computer program product are provided in accordance with an example embodiment in order to provide for improved visualization of spatial data. In this regard, the spatial data may be associated with a map and the visual representation of spatial data may overlay the map. As described herein, the visual presentation of the spatial data of an example embodiment may represent both the value of the spatial data at a particular location and concurrently the certainty associated with the value of the spatial data at the particular location. As such, a user may visually interpret and analyze the spatial data in an efficient and intuitive manner even as the quantity of spatial data that is represented by the visual presentation increases, such as from megabytes of spatial data to gigabytes or more of spatial data.

Figure 1:
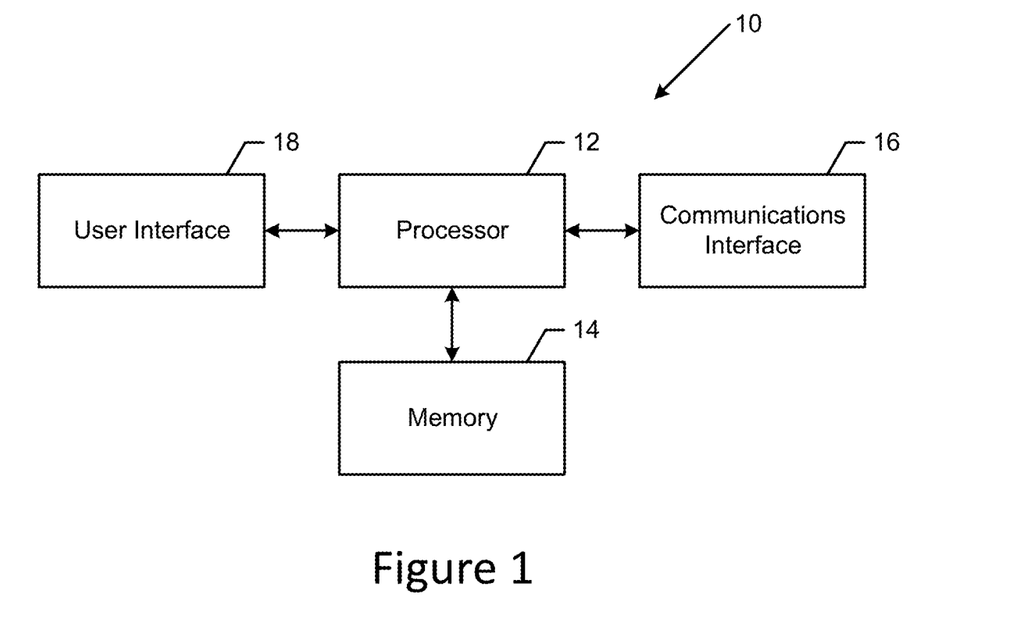
FIG. 1 is a block diagram of an apparatus that may be specifically configured in accordance with an example embodiment.

An apparatus for supporting visualization and spatial data in accordance with an example embodiment may be embodied by a variety of computing devices. For example, these computing devices may include, for example, a personal computer, a computer workstation, a laptop computer, at tablet computer or a mobile terminal, such as a smartphone or the like, that are configured to analyze and visualize spatial data. Alternatively, the computing device that embodies the apparatus may include a navigation system, an advanced driver assistance system (ADAS), a GPS system or the like. Regardless of the type of computing device that embodies the apparatus, the apparatus 10 of an example embodiment may include, may be associated with or may otherwise be in communication with a processor 12 and a memory device 14 and optionally a communication interface 16 and/or a user interface 18, as shown in FIG. 1.

In some embodiments, the processor 12 (and/or co-processors or any other processing circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device therefore serves as a computer-readable storage medium, which refers to a physical storage medium (e.g., volatile or non-volatile memory device), and is differentiated from a computer-readable transmission medium, which refers to an electromagnetic signal. The memory device may be configured to store information, data, content, applications, instructions, or the like for enabling the apparatus to carry out various functions in accordance with an example embodiment. For example, the memory device could be configured to buffer input data for processing by the processor. Additionally or alternatively, the memory device could be configured to store instructions for execution by the processor.

As noted above, the apparatus 10 may be embodied by a computing device including those described above. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment also optionally includes a communication interface 16 that may be any means such as a device or circuitry embodied in either hardware or a combination of hardware and software that is configured to receive and/or transmit data from/to other electronic devices in communication with the apparatus, such as by being configured to receive spatial data or a representation of spatial data from a server or other data source. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 1, the apparatus 10 may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

Figure 2:
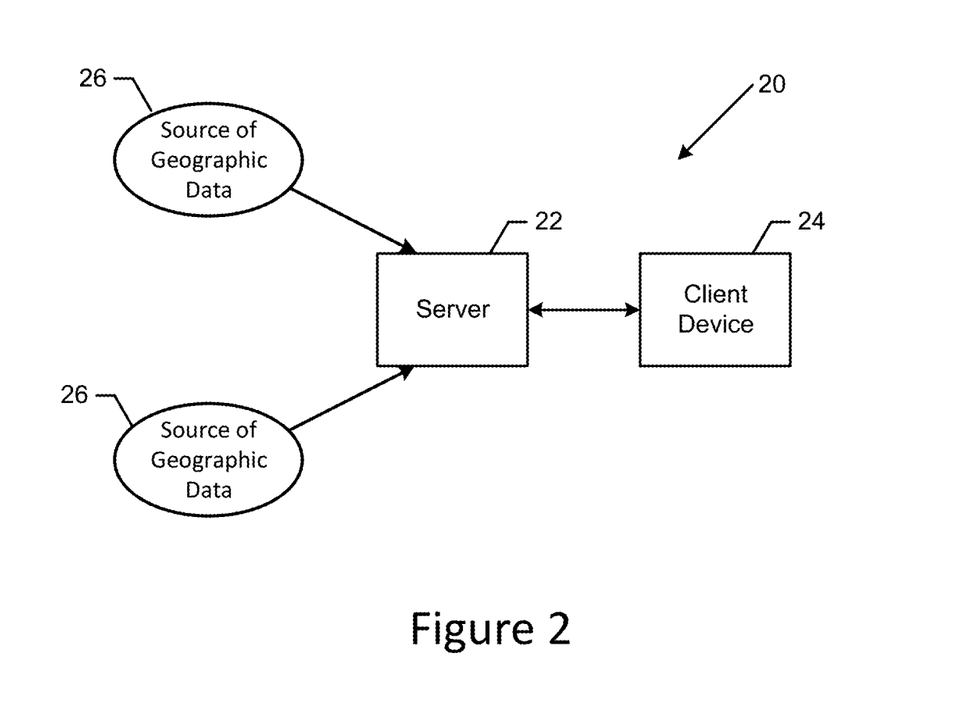
FIG. 2 is a block diagram of a client server system that embodies the apparatus of FIG. 1 and that may also be specifically configured in accordance with an example embodiment.

In an example embodiment, the apparatus 10 is embodied by a client device of a client-server system. As described above, the client device may be any of a variety of different types of computing devices including, for example, a personal computer, a computer workstation, a laptop computer, at tablet computer, a mobile terminal, an ADAS or a GPS system. Although a client-server configuration is depicted in FIG. 2 and will be referenced hereinbelow in regards to the description of one embodiment, the apparatus may be differently configured in other embodiments. For example, the apparatus need not necessarily be embodied by a client-server system, but may, instead, have a variety of different networked configurations. In the example embodiment of FIG. 2, however, the client server system 20 includes a server 22 and a client device 24 in communication therewith. The client device of this example embodiment embodies the apparatus. The server may also be configured to receive spatial data from one or more sources 26, such as from one or more data providers that create, aggregate or otherwise supply the spatial data, and/or one or more databases that store spatial data.

Figure 3:
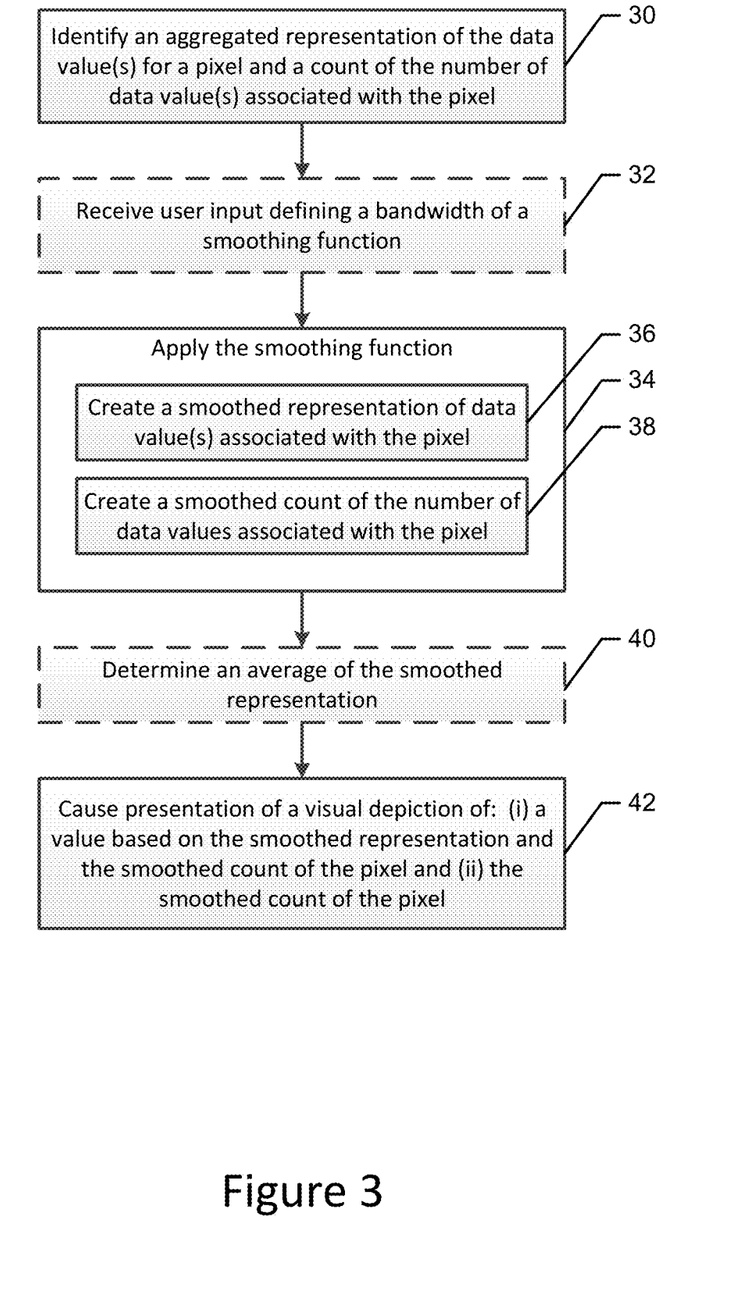
FIG. 3 is a block diagram illustrating the operations performed, such as by the apparatus of FIG. 1, in accordance with an example embodiment.

Regardless of the particular configuration in which the apparatus 10 is deployed, the operations performed for visualizing spatial data, such as by the apparatus of FIG. 1, in accordance with an example embodiment are shown in FIG. 3. In this regard, the spatial data may represent any of a wide variety of different types of parameters that are associated with respective spatial locations. In this regard, spatial data may include any data have a spatial component so as to be associated with a respective location in space including, but not limited to two-dimensional or three-dimensional spaces. As such, one type of spatial data as used herein comprises geographic data. Although the method, apparatus and computer program product of an example embodiment may operate upon continuous data, the embodiments of the method, apparatus and computer program product described below operate upon discreet spatial data. For example, spatial data may include data indicative of the signal strength of cellular or other types of network signals at each of a plurality of different spatial locations. Other examples of spatial data include various types of weather data, such as temperature, humidity, rainfall, snow accumulation or the like, with the weather data being measured at and associated with different spatial locations, as well as data defining the speed at which vehicles are traveling at different locations along a road network. Regardless of the type of spatial data, the spatial data is generally visualized by presenting a visual representation of the spatial data upon a display, such as by overlaying a representation of the spatial data upon a map that is presented upon a display. The display includes a plurality of individually addressable grid cells, each of which is associated with a respective spatial location. Although the grid cells may form a multi-dimensional grid, such as a three-dimensional grid, the grid cells of a two-dimensional grid may also be referred to as pixels.

In conjunction with the display of the spatial data, the spatial data is initially received or accessed. For example, the spatial data may be received from one or more data providers. For example, in an embodiment in which the spatial data defines the signal strength of signals transmitted by a plurality of users of a cellular network from different spatial locations, the cellular service provider or the cellular network operator may provide the spatial data in the form of signal strength measurements for different spatial locations. Alternatively, the spatial data may be stored such as in a database, e.g., cloud storage or other database or repository, and may be accessed for purposes of analysis and visualization.

For the spatial data to be displayed, the spatial data is associated with a respective grid cell of the resulting display. For each of a plurality of grid cells, the apparatus 10 includes means, such as the processor 12 or the like, for identifying an aggregated representation of one or more data values associated with a respective grid cell and a count of the number of data value(s) that are associated with the respective grid cell. See block 30 of FIG. 3. In an example embodiment in which the apparatus receives or accesses the spatial data, the apparatus, such as the processor, is configured to identify the aggregated representation and the count associated with each of a plurality of grid cells based upon the spatial data that is received or accessed. Various types of aggregated representations of the data value(s) associated with a respective grid cell may be determined. In an example embodiment in which the spatial data is numerical, the aggregated representation may be the average of the data values associated with the respective grid cell, while the count represents the number of data values that are associated with the respective grid cell. In relation to the count, the count of an example embodiment includes any weighting of the number of data values associated with a respective grid cell. For example, the number associated with a respective grid cell may be weighted such that each increment represents a predetermined number, e.g., five, of data values. In this example, a number of 10 associated with a respective grid cell is weighted such that the count associated with the same grid cell is 50, that is 10×5.

In another example embodiment depicted in FIG. 2, the server 22 may be configured to receive or access the spatial data instead of or in addition to the client device 24 which embodies the apparatus 10. In this example embodiment, the server is configured to initially determine, for each of a plurality of grid cells, the aggregated representation, such as the average, of one or more data values associated with a respective grid cell as well as the count of the number of data values that are associated with the respective grid cell. The server may, in turn, provide the aggregated representation and the count to the client device, either directly or indirectly in which the aggregated representations and the counts are stored and the client device is provided with an address at which the aggregated representations and the counts are stored to facilitate access by the client device. As such, in this example embodiment, the apparatus, such as the processor 12, is configured to identify the aggregated representation and the count by receiving the aggregated representation and the count from the server. By leveraging the server, however, to compute the aggregated representation and the count associated with each of a plurality of grid cells, a large quantity of spatial data, such as gigabytes or more of spatial data, may be received or accessed and then subsequently processed by the server to create the aggregated representation and the count, even though the client device may be unable to efficiently and quickly process a such large amounts of spatial data. Instead, the client device including the apparatus of this example embodiment receives the resulting aggregated representation and the resulting count for each of a plurality of grid cells that has been computed by the server and may therefore support visualization and analysis of the spatial data in the manner described below. Consequently, greater quantities of spatial data than the client device is capable of processing in a timely manner may be efficiently processed by the server such that the apparatus embodied by the client device may thereafter permit visualization and analysis of these greater quantities of spatial data.

The apparatus 10 of an example embodiment also includes means, such as the processor 12 or the like, for applying a smoothing function to the aggregated representations and the counts of the plurality of grid cells. See block 34 of FIG. 3. In this regard, the apparatus, such as the processor, does not simply process the aggregated representation and the count for each grid cell independently of the other grid cells, but, instead, smoothes the aggregated representations and the count of a respective grid cell based upon the aggregated representations and counts of neighboring grid cells. In an example embodiment of applying a smoothing function, the apparatus includes means, such as the processor or the like, for creating a smoothed representation of the one or more data values associated with the respective grid cell such that the aggregated representation of one or more neighboring grid cells influences the smoothed representation of the respective grid cell. See block 36 of FIG. 3. Similarly, the apparatus of this example embodiment includes means, such as the processor or the like, for creating a smoothed count of the number of data values that are associated with the respective grid cell such that the counts of one or more neighboring grid cells influence the smoothed count of the respective grid cell. See block 38 of FIG. 3.

Figure 4:
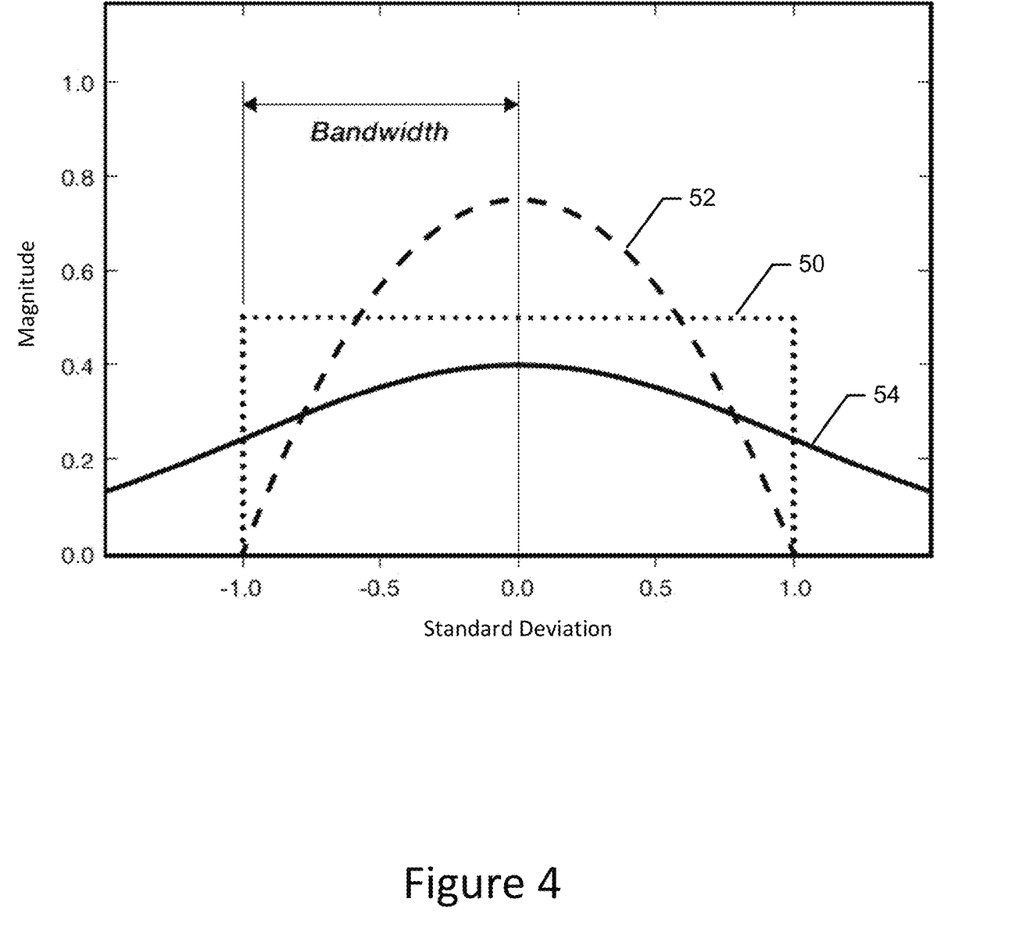
FIG. 4 is a graphical representation of several alternative smoothing functions that may be utilized in accordance with an embodiment.

The apparatus 10, such as the processor 12, may employ a variety of different smoothing functions. In an example embodiment, however, the apparatus, such as the processor, utilizes one of a uniform function, an Epanechnikov function or a Gaussian function, each of which is depicted in FIG. 4. As shown FIG. 4, the uniform function 50 has a constant magnitude across its bandwidth, while the Epanechnikov function 52 and Gaussian function 54 have magnitudes which vary across their bandwidth in a symmetrical fashion relative to the center of the function. While three types of smoothing functions are depicted in FIG. 4 and the Gaussian function will be utilized by way of example in conjunction with the following discussion, the apparatus, such as the processor, will utilize other types of smoothing functions in other example embodiments. Regardless of its type, the smoothing function of an example embodiment is sized and shaped such that the area or volume under the curve has a predetermined size, such as 1 in relation to the smoothing functions of FIG. 4.

For a respective grid cell, the smoothing function is centered about the respective grid cell and has a bandwidth of the smoothing function that may be defined in various manners. As shown in FIG. 4, the bandwidth of the smoothing function may be defined in terms of the standard deviation of the aggregated representations of the data value(s) of the plurality of grid cells. In this regard, the bandwidth of the example embodiment is 1 standard deviation, thereby identifying neighboring grid cells that lie within a radius of 1 standard deviation from the respective grid cell to be utilized for purposes of smoothing the aggregated representation and the count associated with the respective grid cell. Alternatively, the bandwidth may be defined in terms of the number of neighboring grid cell that will be referenced in conjunction with smoothing the aggregated representation and the count associated with a respective grid cell. In this regard, the bandwidth of the smoothing function may be defined in terms of the numbers of grid cells, such as a radius defined in terms of a number of grid cells centered about the respective grid cell. As another example, the bandwidth may be defined in terms of a spatial distance which may, in turn, be converted to a number of grid cells based upon the geometrical dimensions represented by the respective grid cells.

Although the bandwidth may be predefined or may otherwise be determined based upon the standard deviation of the aggregated representations of the data value(s) of the plurality of grid cells, the apparatus 10 of an example embodiment includes means, such as the processor 12, the user interface 18 or the like, for receiving user input defining the bandwidth of the smoothing function with the user-defined bandwidth thereafter being utilized in conjunction with application of the smoothing function to the aggregated representation and the count associated with the respective grid cell. See block 32 of FIG. 3. As described below, a user may therefore review the visualization of the spatial data following application of a smoothing function having a predefined bandwidth and may then adjustably vary the bandwidth in order to alter the resulting visualization of the spatial data, thereby permitting the user to determine whether a different bandwidth results in a more informative or intuitive visualization of the spatial data.

In regards to applying the smoothing function to create a smoothed representation of the one or more data values associated with the respective grid cell in accordance with an example embodiment, the aggregated representation of the data value(s) associated with each of the neighboring grid cells within the bandwidth of the smoothing function is multiplied by the magnitude of the smoothing function associated with the respective spatial location of the neighboring grid cells relative to the respective grid cell. For each of the plurality of grid cells, the aggregated representation of the data value(s) associated with each of the neighboring grid cells that is multiplied by the smoothing function takes into account both the value and the number of data value(s) associated with the respective grid cell. For example, in an instance in which the aggregated representation for a grid cell is the average of the data value(s) associated with the grid cell, the average of the data value(s) is multiplied by both the number of data value(s) and magnitude of the smoothing function. With respect to a smoothing function in the form of a Gaussian function 54 having a bandwidth of 1 standard deviation as shown in FIG. 4, for example, the magnitude of the smoothing function associated with grid cells located a quarter of the standard deviation from the respective grid cell is approximately 0.375 such that each grid cell that is located at a distance that corresponds to one quarter of the standard deviation from the respective grid cell has its aggregated representation, e.g., the product of the average of the data value(s) and the number of data value(s), multiplied by 0.375. To continue with this example, the aggregated representation, e.g., the product of the average of the data value(s) and the number of data value(s), of each grid cell that is offset from the respective grid cell by a distance that corresponds to half of the standard deviation is multiplied by the magnitude of the smoothing function associated with a displacement that corresponds to one half of the standard deviation from the respective grid cell, that is, approximately 0.325.

The smoothing functions illustrated in FIG. 4 and described herein are one-dimensional. In other embodiments, however, the spatial data is two-dimensional, three-dimensional or of greater dimensions such that the smoothing function is correspondingly two-dimensional, three-dimensional or of greater dimensions so as to be of the same dimension as the spatial data. In an instance in which the spatial data is two-dimensional and discreet, the smoothing function is also two-dimensional and may be shaped by rotating the one-dimensional smoothing function about a vertical axis through the respective grid cell and then sized to define a predefined volume under the curve. In an instance in which the smoothing function is normalized such that the volume under the curve is 1, the value of the smoothing function at +/−1 standard deviation is approximately $0.242^2$ (or 0.05855), that is, the double integral over the two-dimensional smoothing function.

This process of weighting the aggregated representation of the neighboring grid cells based upon the magnitude of the smoothing function at a corresponding spatial location relative to the respective grid cell is repeated by the apparatus 10, such as the processor 12, for each grid cell within the bandwidth of the smoothing function. In this example embodiment, the resulting product for each neighboring grid cell within the bandwidth of the smoothing function is summed along with the aggregated representation for the respective grid cell. In this regard, the aggregated representation of the respective grid cell may also be weighted by the smoothing function. To continue with the foregoing example utilizing the Gaussian function 54 of FIG. 4 as the smoothing function, the aggregated representation, e.g., the product of the average of the data value(s) and the number of data value(s), of the respective grid cell may be multiplied by 0.4, that is, the magnitude of the Gaussian function at a displacement of 0. In an example embodiment, this sum serves as a smoothed representation of the one or more data values associated with respective grid cell as influenced by the aggregated representations of the neighboring grid cells within the bandwidth of the smoothing function.

In a like fashion, the smoothing function is applied to the count of the number of data value(s) associated with the respective grid cell. In this regard, the counts associated with the neighboring grid cells within the bandwidth of the smoothing function may be multiplied by the magnitude of the smoothing function at a spatial location corresponding to the respective neighboring grid cells. With reference to the foregoing example in which the Gaussian function 54 of FIG. 4 is utilized as the smoothing function, the count of each grid cell that is located at a distance that corresponds to one quarter of the standard deviation from the respective grid cell is multiplied by the magnitude of the smoothing function associated with a displacement that corresponds to one half of the standard deviation from the respective grid cell, that is, approximately 0.375. To continue with this example, the count of each grid cell that is offset from the respective grid cell by a distance that corresponds to half of the standard deviation is multiplied by the magnitude of the smoothing function associated with a displacement that corresponds to one half of the standard deviation from the respective grid cell, that is, approximately 0.325. This process of weighting the counts of the neighboring grid cells based upon the magnitude of the smoothing function at a corresponding spatial location relative to the respective grid cell is repeated by the apparatus 10, such as the processor 12, for each grid cell within the bandwidth of the smoothing function. In this example embodiment, the resulting product for each neighboring grid cell within the bandwidth of the smoothing function is summed along with the count for the respective grid cell. In this regard, the count for the respective grid cell may also be weighted by the smoothing function. To continue with the foregoing example utilizing the Gaussian function of FIG. 4 as the smoothing function, the count of the respective grid cell may be multiplied by 0.4, that is, the magnitude of the Gaussian function at a displacement of 0. In an example embodiment, this sum serves as a smoothed count of the number of data value(s) associated with respective grid cell as influenced by the counts of the neighboring grid cells within the bandwidth of the smoothing function.

This process of creating a smoothed representation of the data value(s) associated with a respective grid cell and creating a smoothed count of the number of data values associated with the respective grid cell is repeated by the apparatus 10, such as the processor 12, for each of the plurality of grid cells. In an example embodiment, the process of creating a smoothed representation of the data value(s) associated with a respective grid cell and creating a smoothed count of the number of data values associated with the respective grid cell may be performed in parallel for a number of the grid cells, thereby further increasing the speed and efficiency of the overall process.

Following the application of the smoothing function, the apparatus 10 includes means, such as the processor 12, the user interface 18 or the like, for causing the presentation for each of the plurality of grid cells of a visual depiction of: (i) a value based on the smoothed representation and the smoothed count of the respective grid cell and (ii) the smoothed count of the respective grid cell. See block 42 of FIG. 3. The visual depiction may be presented upon a display, such as a two-dimensional display. Although various types of values that are based on the smoothed representation and the smoothed count of a respective grid cell may be visually depicted, the apparatus of an example embodiment includes means, such as the processor or the like, for determining, for each of the plurality of grid cells, an average of the smoothed representation for the respective grid cell. See block 40 of FIG. 3. In this regard, the apparatus, such as the processor, may divide the smoothed representation, which is described above to be the sum of the aggregated representation of the respective grid cell and of one or more neighboring grid cells following application of the smoothing function, by the smoothed count of the number of data values associated with the respective grid cell, such as represented by the sum of the count associated with the respective grid cell and the neighboring grid cells following application of the smoothing function. In this example embodiment, the value that is visually depicted is based upon and represents the average.

By concurrently presenting a visual depiction of both: (i) the value based on the smoothed representation and the smoothed count of the respective grid cell and (ii) the smoothed count of the respective grid cell, the resulting bivariate display provides a heat map with information with respect to two different parameters, namely, the value of the respective grid cell and the smoothed count which, in turn, represents the certainty of the value of the respective grid cell. As such, larger smoothed counts are indicative of greater certainty with respect to the value of the respective grid cell than smaller smoothed counts.

Although the visual depiction of the value based on the smoothed representation and the smoothed count of the respective grid cell and the visual depiction of the smoothed count of the respective grid cell may be presented in various manners, the plurality of grid cells of an example embodiment comprise a map upon which the value and the smoothed count are represented, such as by overlaying the map. For example, the apparatus 10, such as the processor 12, the user interface 18 or the like, may cause the presentation of a visual depiction of the value with the value represented by a color of the respective grid cell. As such, different values or different ranges of values may be associated with different colors. In this regard, the color of the respective grid cell may be selected from a color palette including red, green, blue and various combinations thereof or may be selected from the grayscale such that different values are represented by the different grayscale values.

In this example embodiment, the apparatus 10, such as the processor 12, the user interface 18 or the like, is also configured to cause presentation of a visual depiction of the smoothed count with the smoothed count represented by the opacity of the respective grid cell. Thus, the relative degree of transparency or translucity of the respective grid cell is indicative of the smoothed count. In accordance with one example, larger values of the smoothed count result in increased opacity, while smaller values of the smoothed count result in increased transparency. In an example embodiment in which the value is represented by a color including red, green, blue and combinations thereof, the processor may be configured to implement or otherwise be associated with a graphics system having four channels, three of which are for defining the red, green and blue contributions for the respective grid cells and a fourth alpha channel defining the level of transparency of an overlying layer in accordance with the smoothed count as described above.

Figure 5:
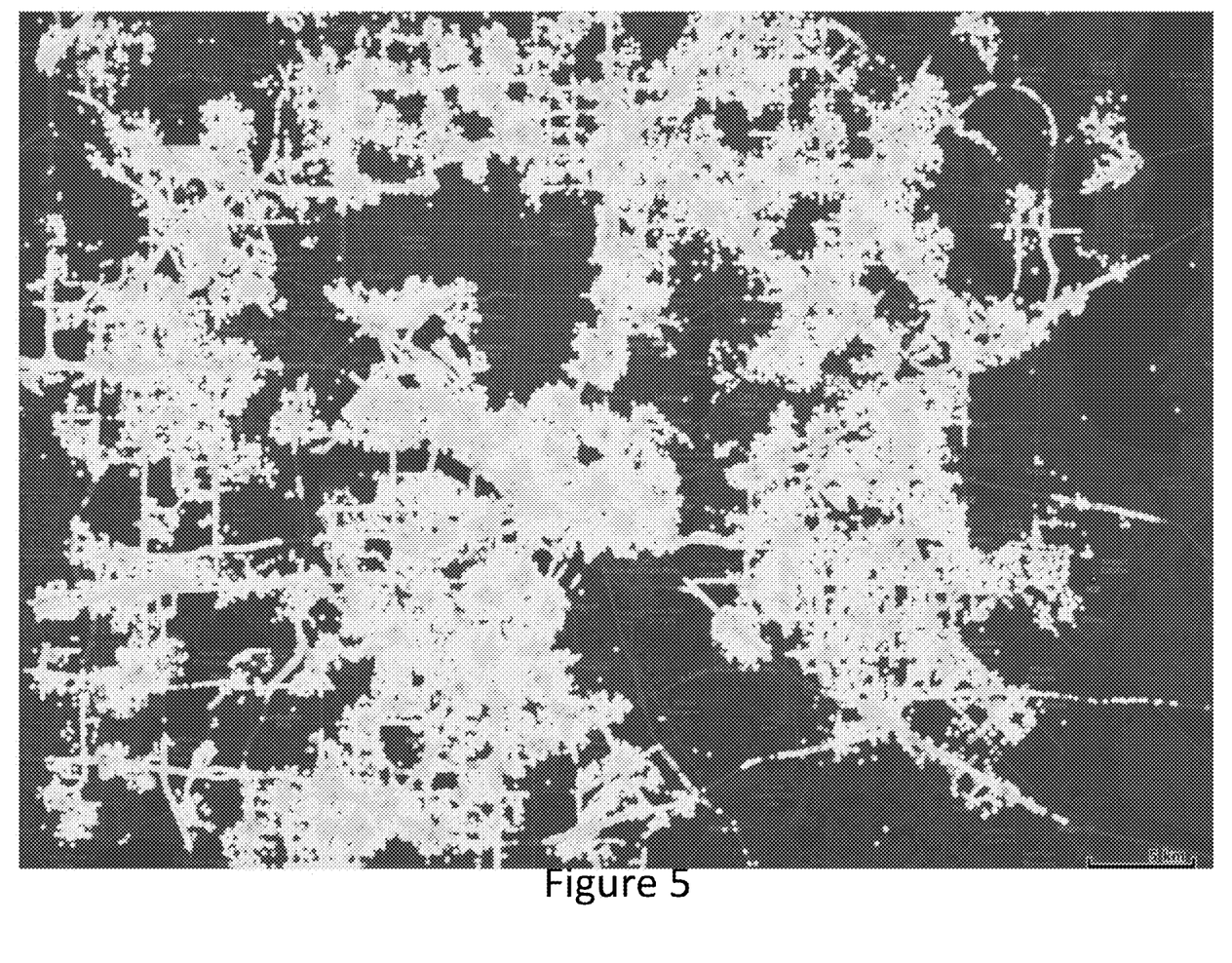
FIG. 5 is an example presentation of a visual depiction of a value based on the smoothed representation and the smoothed count of the respective grid cells in accordance with an example embodiment.

By way of example, FIG. 5 depicts the visual depiction of a value based on the smoothed representation and the smoothed count of each of a plurality of grid cells representative of spatial data indicative of the signal strength of cellular signals at various spatial locations. As shown, the visual depiction of the value is overlaid on a map with different colors representative of different values. In this example embodiment, those grid cells having a greenish color are a representative of larger values and, as a result, spatial locations experiencing greater signal strength, while grid cells having a yellowish color are a representative of smaller values and, as a result, spatial locations experiencing lower signal strength. The visual depiction of FIG. 5 does not, however, alter the opacity of the visual depiction of the value based upon the certainty associated with the different values.

Figure 6:
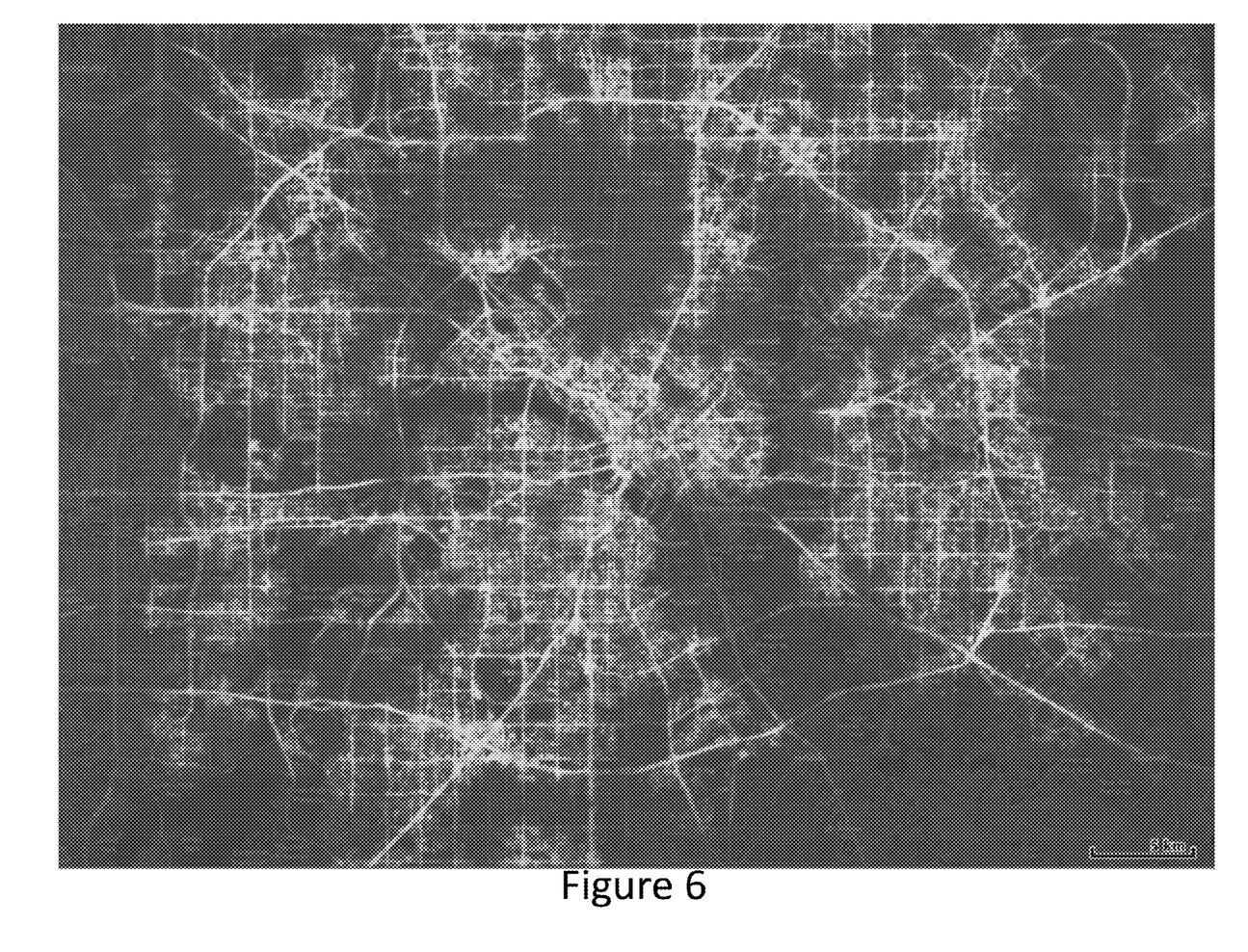
FIG. 6 is an example presentation of the visual depiction of the value in combination with the visual depiction of the smoothed count of the respective grid cells in accordance with an example embodiment.

In FIG. 6, however, the visual depiction of the values of FIG. 5 as well as the visual depiction of the smoothed count of the respective grid cells as represented by the opacity of the respective grid cells is shown. In this regard, the grid cells having a relatively large smoothed count and, as a result, a greater certainty remain relatively opaque and visible, while the grid cells having a smaller smoothed count and, as a result, less certainty, are made increasingly transparent and, therefore, less visible. By reviewing the resulting display, such as shown in FIG. 6, the user may intuitively understand the value representative of the spatial data as well as the certainty associated with the values of the different grid cells of the display.

In an example embodiment, the apparatus 10 is embodied by, is associated with or supports a web browser such that the presentation of the visual depiction of the value and the smoothed count is provided by the web browser. In this regard, even in an instance in which the initial receipt or access of the spatial data and the computation of an aggregated representation of the spatial data and the count of the spatial data associated with the different respective grid cells is performed by a server 22, the resulting visual depiction is presented by a web browser in communication, directly or indirectly, with the server, such as shown in the example embodiment of FIG. 2. As a result of the presentation of the visual depiction of the value and the smoothed count by web browser, a user may interact via the web browser with the resulting display, such as by panning and zooming, and may change the bandwidth of the smoothing function as noted above in order to explore or otherwise analyze the spatial data in an intuitive and efficient manner and without having to download the spatial data from the server or otherwise. As such, the user may readily visualize the spatial data, such as in the context of a map, and readily determine the distribution of the spatial data.

The apparatus 10, such as the processor 12, of an example embodiment may be configured to receive and process spatial data of various different types, such as spatial data expressed in a linear, logarithmic or decibel form. Regardless of the form of the spatial data, the apparatus, such as the processor, is configured to take into account the form of the spatial data and to process the spatial data, such as by determining the aggregated representation of the data value (s) associated with the respective grid cell and the creation of a smoothed representation of the data values associated with the respective grid cell. In an instance in which the spatial data has either a logarithmic or decibel form, the determination of the aggregated representation or creation of the smoothed representation of the data value(s) associated with the respective grid cell takes into account the respective form of the spatial data such that the spatial data is appropriately aggregated and smoothed. As such, the resulting method, apparatus and computer program product of an example embodiment are both versatile and flexible in relation to the visualization and analysis of different forms of spatial data.

FIG. 3 illustrates a flowchart of an apparatus 10, method and computer program product according to example embodiments. It will be understood that each block of the flowchart, and combinations of blocks in the flowchart, may be implemented by various means, such as hardware, firmware, processor, circuitry, and/or other communication devices associated with execution of software including one or more computer program instructions. One or more of the procedures described above may be embodied by computer program instructions. For example, the operations described in the context of FIG. 3 may be performed in response to the execution of an application programming interface (API), such as a JavaScript API. One example of a suitable JavaScript API is a Web Graphics Library (WebGL), the execution of which by the processor 12 may cause all or some of the operations of FIG. 3 to be performed. In this regard, the computer program instructions which embody the procedures described above may be stored by a memory device 14 of an apparatus employing an embodiment and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above and are illustrated by the dashed lines in FIG. 3. Modifications, additions, or amplifications to the operations above may be performed in any order and in any combination.

Many modifications and other embodiments set forth herein will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
for each of a plurality of grid cells, identifying an aggregated representation of one or more data values associated with a respective grid cell and a count of a number of data values that are associated with the respective grid cell, wherein the aggregated representation reduces a total quantity of data values associated with each of the plurality of grid cells;
applying a smoothing function having a bandwidth to the aggregated representations and the counts of the plurality of grid cells, wherein applying the smoothing function creates a smoothed representation of the one or more data values associated with the respective grid cell such that the aggregated representation of one or more neighboring grid cells within the bandwidth of the smoothing function influences the smoothed representation of the respective grid cell, wherein applying the smoothing function for a respective grid cell comprises combining, for each of the one or more neighboring grid cells within the bandwidth of the smoothing function centered upon the respective grid cell, a product of the aggregated representation, the count and a magnitude of the smoothing function at a location of each grid cell, and wherein applying the smoothing function also creates a smoothed count of the number of data values that are associated with the respective grid cell, wherein the count represents a certainty of the magnitude; and
for each of the plurality of grid cells, causing presentation of a visual depiction of: (i) a value based on the smoothed representation and the smoothed count of the respective grid cell and (ii) the smoothed count of the respective grid cell.

2. A method according to claim 1 wherein the plurality of grid cells comprise a map upon which the value and the smoothed count are visually depicted, and wherein causing presentation of a visual depiction comprises causing presentation of a visual depiction of the value with the value represented by a color of the respective grid cell; and causing presentation of a visual depiction of the smoothed count with the smoothed count represented by opacity of the respective grid cell.

3. A method according to claim 1 further comprising determining, for each of the plurality of grid cells, an average of the smoothed representation for the respective grid cell, wherein the value that is visually depicted is based on the average.

4. A method according to claim 1 further comprising receiving user input defining a bandwidth of the smoothing function, wherein applying the smoothing function comprises applying the smoothing function having the bandwidth defined by the user input.

5. A method according to claim 1 wherein the smoothing function comprises one of a uniform function, an Epanechnikov function or a Gaussian function.

6. A method according to claim 1 wherein causing presentation of a visual depiction comprises causing presentation of a visual depiction by a web browser.

7. A method according to claim 6 wherein identifying the aggregated representation and the count comprises receiving by the web browser the aggregated representation and the count from a server.

8. An apparatus comprising at least one processor and at least one memory including computer program code, the at least one memory and computer program code configured to, with the processor, cause the apparatus to at least:
for each of a plurality of grid cells, identify an aggregated representation of one or more data values associated with a respective grid cell and a count of a number of data values that are associated with the respective grid cell, wherein the aggregated representation reduces a total quantity of data values associated with each of the plurality of grid cells;
apply a smoothing function having a bandwidth to the aggregated representations and the counts of the plurality of grid cells, wherein applying the smoothing function creates a smoothed representation of the one or more data values associated with the respective grid cell such that the aggregated representation of one or more neighboring grid cells within the bandwidth of the smoothing function influences the smoothed representation of the respective grid cell, wherein applying the smoothing function for a respective grid cell comprises combining, for each of the one or more neighboring grid cells within the bandwidth of the smoothing function centered upon the respective grid cell, a product of the aggregated representation, the count and a magnitude of the smoothing function at a location of each grid cell, and wherein applying the smoothing function also creates a smoothed count of the number of data values that are associated with the respective grid cell, wherein the count represents a certainty of the magnitude; and
for each of the plurality of grid cells, cause presentation of a visual depiction of: (i) a value based on the smoothed representation and the smoothed count of the respective grid cell and (ii) the smoothed count of the respective grid cell.

9. An apparatus according to claim 8 wherein the plurality of grid cells comprise a map upon which the value and the smoothed count are visually depicted, and wherein the at least one memory and computer program code are configured to, with the processor, cause the apparatus to cause presentation of a visual depiction by causing presentation of a visual depiction of the value with the value represented by a color of the respective grid cell; and by causing presentation of a visual depiction of the smoothed count with the smoothed count represented by opacity of the respective grid cell.

10. An apparatus according to claim 8 wherein the at least one memory and computer program code are further configured to, with the processor, cause the apparatus to determine, for each of the plurality of grid cells, an average of the smoothed representation for the respective grid cell, wherein the value that is visually depicted is based on the average.

11. An apparatus according to claim 8 wherein the at least one memory and computer program code are further configured to, with the processor, cause the apparatus to receive user input defining a bandwidth of the smoothing function, and wherein the at least one memory and computer program code are configured to, with the processor, cause the apparatus to apply the smoothing function by applying the smoothing function having the bandwidth defined by the user input.

12. An apparatus according to claim 8 wherein the smoothing function comprises one of a uniform function, an Epanechnikov function or a Gaussian function.

13. An apparatus according to claim 8 wherein the at least one memory and computer program code are configured to, with the processor, cause the apparatus to cause presentation of a visual depiction by causing presentation of a visual depiction by a web browser.

14. An apparatus according to claim 13 wherein the at least one memory and computer program code are configured to, with the processor, cause the apparatus to identify the aggregated representation and the count by receiving by the web browser the aggregated representation and the count from a server.

15. A computer program product comprising at least one non-transitory computer-readable storage medium having computer-executable program code portions stored therein, the computer-executable program code portions comprising program code instructions configured to:
for each of a plurality of grid cells, identify an aggregated representation of one or more data values associated with a respective grid cell and a count of a number of data values that are associated with the respective grid cell, wherein the aggregated representation reduces a total quantity of data values associated with each of the plurality of grid cells;
apply a smoothing function having a bandwidth to the aggregated representations and the counts of the plurality of grid cells, wherein the program code instructions configured to apply the smoothing function comprise program code instructions configured to create a smoothed representation of the one or more data values associated with the respective grid cell such that the aggregated representation of one or more neighboring grid cells within the bandwidth of the smoothing function influences the smoothed representation of the respective grid cell, wherein applying the smoothing function for a respective grid cell comprises combining, for each of the one or more neighboring grid cells within the bandwidth of the smoothing function centered upon the respective grid cell, a product of the aggregated representation, the count and a magnitude of the smoothing function at a location of each grid cell, and wherein the program code instructions configured to apply the smoothing function also comprises program code instructions configured to create a smoothed count of the number of data values that are associated with the respective grid cell, wherein the count represents a certainty of the magnitude; and
for each of the plurality of grid cells, cause presentation of a visual depiction of: (i) a value based on the smoothed representation and the smoothed count of the respective grid cell and (ii) the smoothed count of the respective grid cell.

16. A computer program product according to claim 15 wherein the plurality of grid cells comprise a map upon which the value and the smoothed count are visually depicted, and wherein the program code instructions configured to cause presentation of a visual depiction comprise program code instructions configured to cause presentation of a visual depiction of the value with the value represented by a color of the respective grid cell; and program code instructions configured to cause presentation of a visual depiction of the smoothed count with the smoothed count represented by opacity of the respective grid cell.

17. A computer program product according to claim 15 wherein the computer-executable program code portions further comprise program code instructions configured to determine, for each of the plurality of grid cells, an average of the smoothed representation for the respective grid cell, wherein the value that is visually depicted is based on the average.

18. A computer program product according to claim 15 wherein the computer-executable program code portions further comprise program code instructions configured to receive user input defining a bandwidth of the smoothing function, wherein the program code instructions configured to apply the smoothing function comprise program code instructions configured to apply the smoothing function having the bandwidth defined by the user input.

19. A computer program product according to claim 15 wherein the smoothing function comprises one of a uniform function, an Epanechnikov function or a Gaussian function.

20. A computer program product according to claim 15 wherein the program code instructions configured to cause presentation of a visual depiction comprise program code instructions configured to cause presentation of a visual depiction by a web browser, and wherein the program code instructions configured to identify the aggregated representation and the count comprise program code instructions configured to receive by the web browser the aggregated representation and the count from a server.

* * * * *